United States Patent

[11] 3,597,587

[72] Inventor Frank M. Baum
410 N. Milwaukee Ave., Chicago, Ill. 60610
[21] Appl. No. 59,477
[22] Filed July 30, 1970
[45] Patented Aug. 3, 1971

[54] SEALING DEVICE FOR PLASTIC SHEET MATERIAL
6 Claims, 6 Drawing Figs.
[52] U.S. Cl............................................... 219/243,
53/373, 156/579, 156/583
[51] Int. Cl........................................................ H05b 1/00
[50] Field of Search............................................ 219/243;
156/251, 579, 581, 583; 83/171; 53/373; 30/140

[56] References Cited
UNITED STATES PATENTS
2,824,596 2/1958 Crawford, Jr................. 156/251 X
3,428,512 2/1969 Cooper............................ 156/583 X FOREIGN PATENTS
577,602 6/1958 Italy............................. 83/171

Primary Examiner—J. V. Truhe
Assistant Examiner—C. L. Albritton
Attorney—Max R. Kraus ABSTRACT: A heat sealing device for thermoplastic sheet material is provided with a pivoted pressure bar for pressing two or more layers of thin sheet plastic momentarily against a heated metallic blade. The means for effecting momentary contact includes a crank controlled over center type of spring mounting for a hot steel blade, the mounting normally having stable positions where the steel blade is out of contact with the plastic material to be heat sealed. The crank is so arranged that crank operation will effect quick movement of said steel blade against the plastic for sealing purposes. The arrangement is such that excessively long application of a hot steel blade for heat sealing is averted.

PATENTED AUG 3 1971
3,597,587
SHEET 1 OF 2
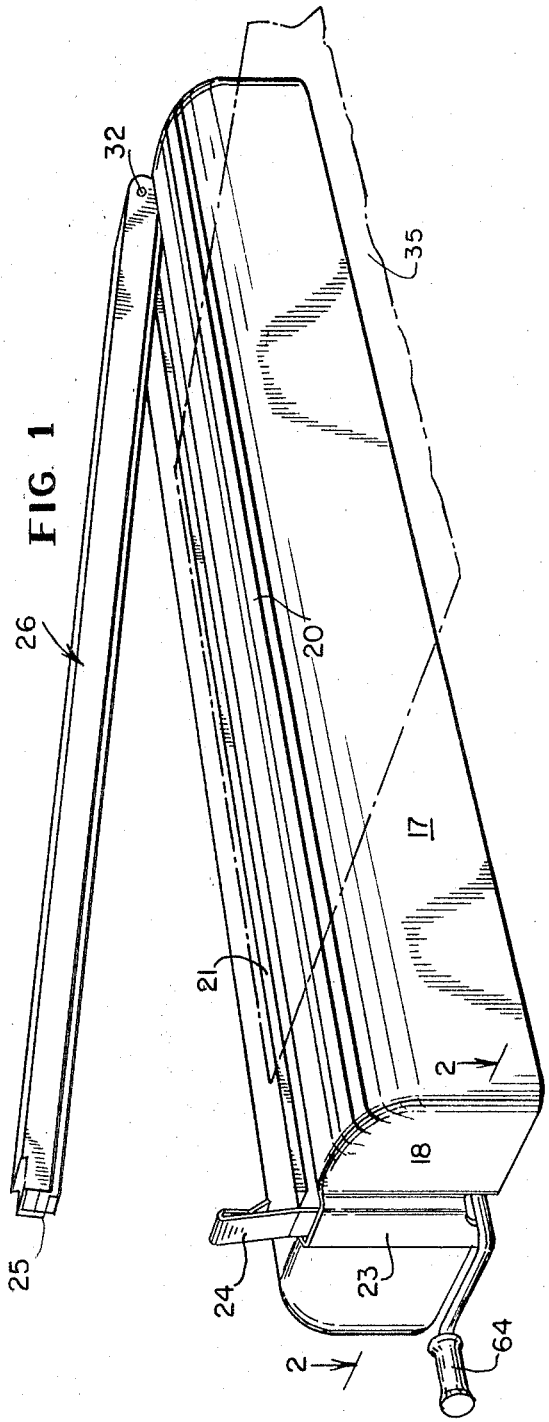
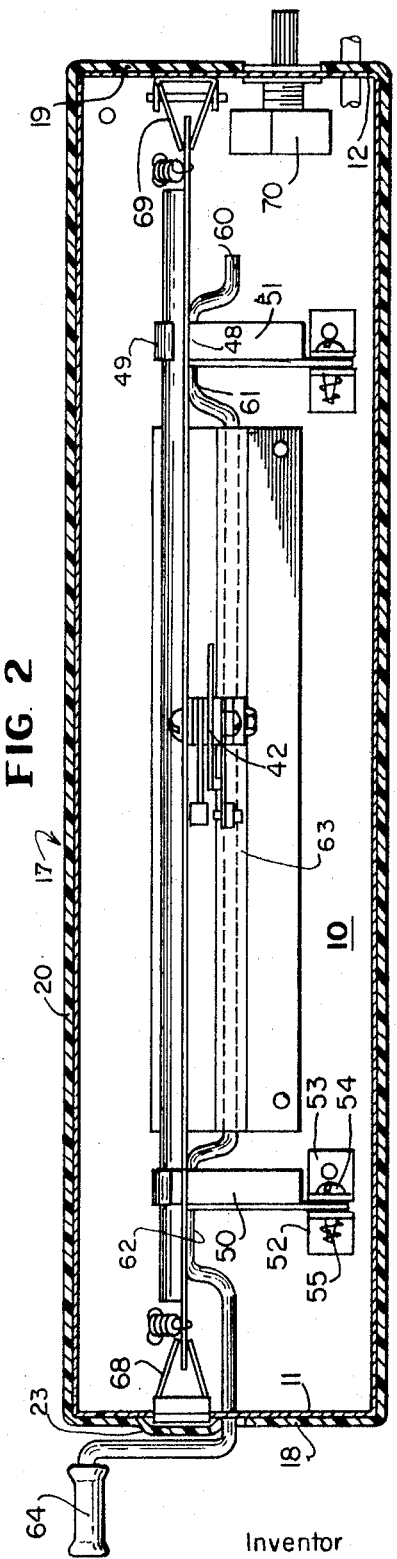
Inventor
FRANK M. BAUM
BY
Max R. Kraus
ATTY.

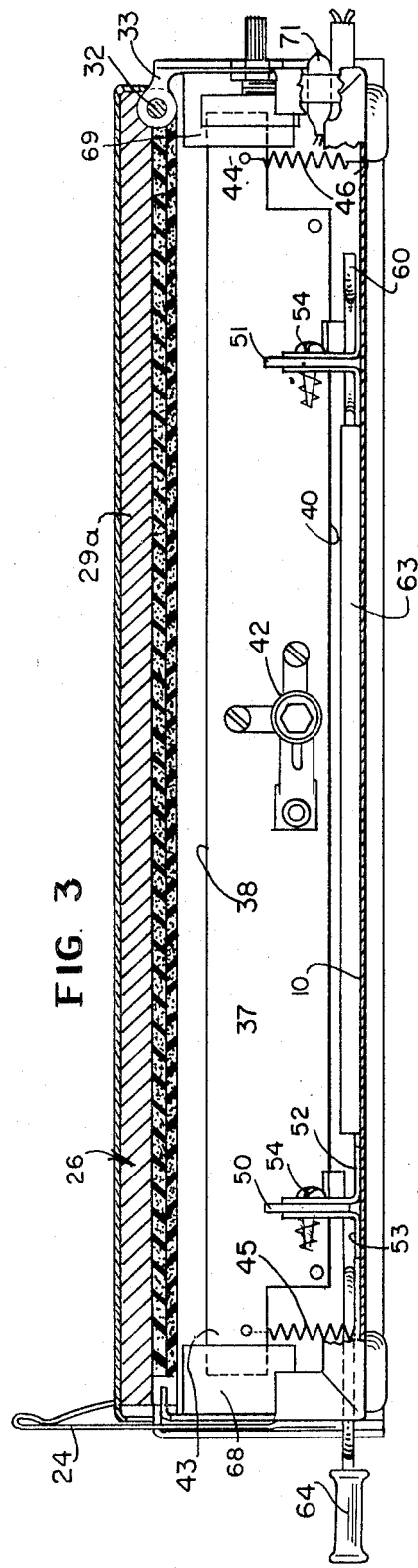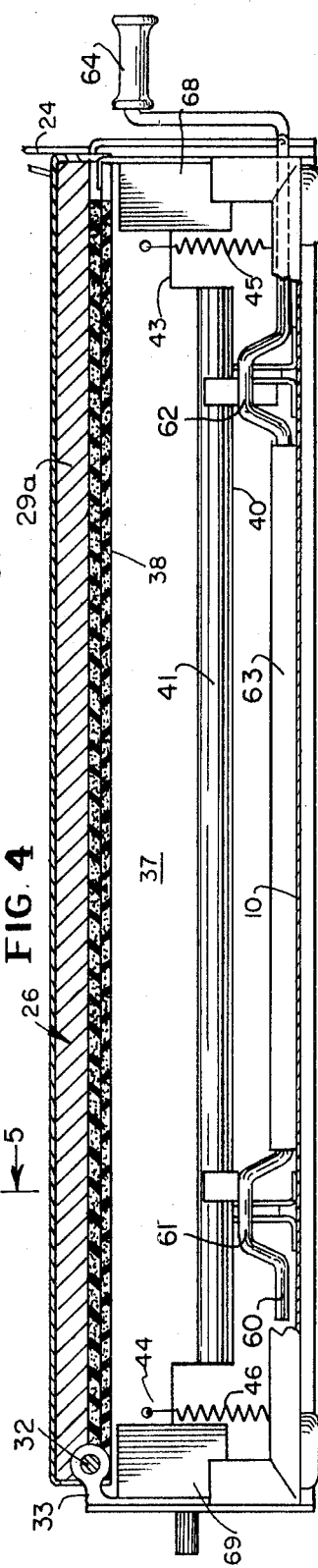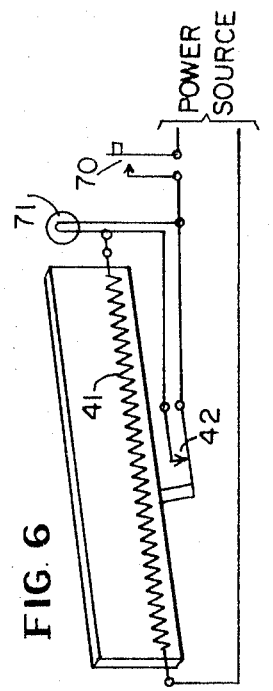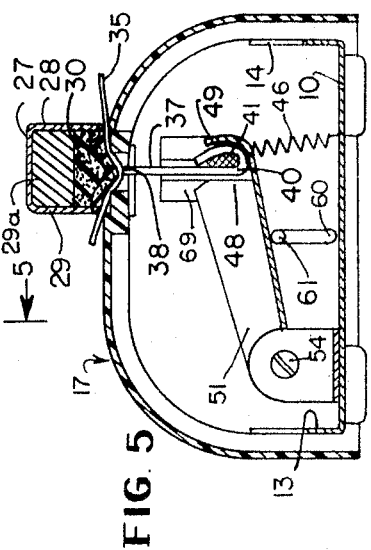
Inventor
FRANK M. BAUM
BY
Max R. Kraus
ATTYS.

SEALING DEVICE FOR PLASTIC SHEET MATERIAL

This invention relates to a device for effecting heat sealing between layers of thermoplastic thin sheet material. Various thermoplastic thin sheet wraps as vinyldene chloride, or polyethylene are available for home use for packaging food items and the like, for storing items of clothing in plastic bags, and for various other purposes. An important consideration in the use of such thin plastic bags or wrapping material relates to providing a hermatic seal of such plastic material to protect the contents against contamination, deterioration, and the like.

The thinness of such plastic wrap is of the order of about a quarter of a thousandth of an inch, so that there is danger of overheating such plastic material when heat sealing. This makes it necessary to apply heat at a predetermined temperature for a short instant of time along a narrow region to effect a heat seal between two normally separate sheets of plastic. In sealing thin plastic sheets together, it is necessary that the component plastic layers to be sealed must be pressed together during heating but kept from sticking to other materials than the plastic layers to be sealed.

While devices for effecting heat sealing between thin thermoplastic layers of wrap are known, they are characterized by mechanical complexity and expensive construction which militate against their use in the home or in small stores. A device embodying the present invention is characterized by mechanical simplicity which eliminates the necessity for expensive tooling in connection with manufacturing such a device in quantity production. In addition, a device embodying the present invention consists of mechanically simple parts readily available, making a device which is easily assembled. The new device is characterized by simplicity of operation and absolute safety against danger of fire or danger to a user.

A device embodying the present invention consists generally of a housing having a gap along the length of the housing. Below the gap within the housing there is disposed a thermostatically controlled electrically heated metal blade adapted to be moved during heat sealing so that the blade edge is disposed just below the gap. A pressing bar normally above said housing and movable into or out of said gap functions to press the work (plastic to be heat sealed) against the housing gap. The pressing bar has an operating surface of Teflon fiberglass or other inert material which will not stick to the plastic work to be sealed and backs up the layers of plastic wrap into appropriate sealing position. The pressing bar is locked during sealing. The hot metal blade can be momentarily snapped upwardly toward the gap so that the hot, sealing edge can engage the work to press the same against the pressing bar for a very short time.

An important feature of the present invention resides in the mechanical simplicity of the means for supporting said sealing blade and moving the same into heat sealing position momentarily to effect quick sealing of the plastic wrap. In general, the blade for effecting sealing is supported on suitable rocker means for permitting blade movement toward or away from said gap. Blade movement is effected by a spring biased over center means having a hand crank normally biased to each of two stable positions (when the sealing blade is inoperative) and manually movable through an unstable position during which the hot blade edge is pressed upwardly against the work to effect heat sealing.

The invention will now be described in connection with the drawings wherein:

FIG. 1 is a perspective view of a heat sealer embodying the present invention, the press bar being raised in condition to receive plastic sheet material for sealing.

FIG. 2 is a plan view along line 2–2 of FIG. 1.

FIG. 3 is a sectional view along line 3–3 of FIG. 1, with the press bar in locked position clamping the plastic material to be sealed.

FIG. 4 is a sectional view generally similar to FIG. 3 but from the other side of the device.

FIG. 5 is a transverse section on line 5–5 of FIG. 4, and

FIG. 6 is a diagrammatic view showing the electrical circuit of the sealer.

The sealing device embodying the invention includes a base 10 having upwardly extending end portions 11 and 12 and side portions 13 and 14. While base 10 may be of any suitable material strong enough to support the various components, it is preferably of sheet metal. Supported by base 10 and the upstanding end and sidewalls of base 10 is housing 17, which may be of molded plastic and may have any desired shape. Housing 17 has ends 18 and 19 and top 20 having longitudinal gap defining portion 21. Housing end wall 18 has laterally outwardly extending offset 23 extending vertically from the base and carries spring clip 24, suitably shaped so that it can cooperate with the free end 25 of press bar assembly 26 for locking the assembly down into operative position, as illustrated in FIGS. 3, 4 and 5. The arrangement shown permits end 25 of the press bar assembly to move downwardly (FIG. 1) past the bent end of clip 24 and lock itself closed (FIG. 3).

The press bar assembly 26 consists of an inverted U-shaped metal strip 27 having sides 28 and 29. Packed into strip 27 is a relatively hard filler strip 29a of asbestos or other cheap heat resistant material. As seen in FIG. 5, below filler 29a and within U-shaped strip 27 is a packing 30 of soft, yielding heat resistant material as Silicone rubber, Teflon or other material which will not adhere to plastic wrap. The plastic wrap material to be worked upon by the sealing machine is thermoplastic and becomes soft when heated. So long as such wrap plastics are not overheated, they will not stick to silicone rubber or Teflon and will not stick to hot metal so long as the contact is short.

Packing layers 30 of plastic are retained between sides 28 and 29 of the press bar, the packing 30 being squeezed in so that it tends to bulge out below the U-shaped press bar. The surface of packing 30 is firm enough so that hot plastic wrap can be heat sealed while pressed against it. Press bar assembly 26 is pivoted at 32 to support bracket 33 carried by sheet metal member 10. Press bar assembly 26 is so positioned with reference to gap 21 in housing 17 as to be disposable over such gap so that the outwardly bulging packing plastic member 30 can extend into the gap and downwardly into the space below the top of housing 17.

Sheet plastic wrap 35 is normally positioned over the gap 21 of housing 17. Disposed within housing 17 is blade 37, preferably of steel, having top edge 38 and bottom portion 40. Electric heating coil 41 in a suitable steel shroud is secured to bottom portion 40 of blade 37. Thermostatic switch 42 is rigidly secured to a side of blade 37 and is electrically connected to heating coil 41 to control the supply of electric current thereto. Thermostatic switch 42 is of the type which may be adjusted for temperature and can be relied upon to keep blade 37 at a substantially constant temperature. Blade 37 has ends 43 and 44 to which are hooked tension springs 45 and 46, the lower ends of said springs being anchored to base 10 of the entire structure. Blade 37 is maintained in a substantially vertical position between portions 48 and 49 of a pair of rocker arms 50 and 51 pivotally secured between small angle irons 52 and 53 at spaced regions along the length of base 10. Pivot pins between angle irons 52 and 53 in each instance are provided by self-locking screws 54 passing through registering apertures in the rocker arms and angle irons passing through suitable holes in the angle irons. Rocker arms 50 and 51 are biased to their lowest position by springs 45 and 46, the arrangement not only biasing the rocker arms to their low position but also retaining blade 37 in position against the rocker arms.

Means are provided for oscillating steel blade 37 vertically. Such means comprise crank rod 60 having lateral offsets 61 and 62 to create cranks, such offsets being respectively located to cooperate with the bodies of rocker arms 50 and 51. Crank rod 60 is retained in position on base 10 by cover plate 63 spot welded to base 10 and serving to retain crank rod 60 in position. Crank rod 60 has an end portion which is bent to provide crank handle 64 and the orientation of handle 64 and crank portions 61 and 62 is such that when handle 64 is down, as illustrated for example in FIGS. 1 and 3, crank portions 61 and 62 will be down against base 10 and permit blade 37 to rest in its lowermost position, as illustrated in FIGS. 2 and 3. When handle 64 is turned from its down position on either side, blade 37 is rocked upwardly by the crank and when handle 64 is in vertical position, blade 37 is temporarily in the position illustrated in FIG. 5, where edge 38 of the blade is forced against the plastic sheet material to be heat sealed. The arrangement of the cranks, springs, and the like is such as to render the vertical position of handle 64 unstable. When a user turns handle 64 to effect a heat sealing operation, the entire arrangement of handle and cranks will go from one normal stable position through the vertical handle position to the other side of the normal stable down position of the handle.

In order to steady blade 37 and maintain it in correct vertical position, clips 68 and 69 disposed on opposite sides of the blade ends are carried by housing ends 11 and 12. Thus, in spite of generous tolerances and lack of precision of various parts, blade 37 will be kept accurately in position to effect a heat sealing action at gap 21 of the housing. An electric switch 70 is mounted at one side of the housing. An electrical circuit is illustrated in FIG. 6 and has indicator lamp 71 shunted by thermostatic switch 42 and in series with heater 41 for showing when the heater is "on" or "off".

What I claim is:

1. Means for heat sealing thin layers of plastic wrap comprising, a normally horizontal base, a long thin metal blade, means for supporting said metal blade in a vertical plane with the edges horizontal above said base, said blade supporting means permitting blade movement through a limited vertical distance, an electric heating element attached to said metal blade for heating the same, means for maintaining said blade in a normal down position with reference to the base, means including a crank for cooperating with said blade to move the same vertically from its normal down position upon crank operation, said blade moving means having stable positions when said blade is in its normal bottom position and being movable through an operating cycle during which said blade is moved upwardly to an unstable top position and then down to its normal stable position, a housing carried by said base and disposed over said blade and base, said housing having the top portion thereof provided with a longitudinal gap disposed above the top edge of said blade and toward which said blade is moved during crank operation to dispose the blade edge in said gap, a press bar assembly carried by said housing on the outside thereof and movable toward and away from the housing gap, said press bar assembly including locking means on said housing for maintaining said press bar assembly down against the housing gap, said press bar assembly including a layer of soft material to which plastic sheet wrap will not stick, said press bar assembly when locked over said housing gap being adapted to back work to be heat sealed, said blade being adapted to be momentarily pressed against the work during a crank operating cycle, said layer of soft nonstick material in said press bar assembly and blade edge momentarily pressing the work therebetween so that when said blade is hot, effective plastic heat sealing is accomplished without damage to the work.

2. The construction according to claim 1 wherein said heat insulating material in said press bar assembly bulges outwardly to push work into the gap in preparation for heat sealing.

3. The construction according to claim 2 wherein said means for moving said metal blade vertically includes an overcenter crank means.

4. A heat sealing mechanism comprising, a flat elongated base plate, a housing including end portions carried by said base plate, a pair of guide plates at each housing end portion, a thin elongated metal blade normally disposed in a generally vertical plane with a free edge at the top of said blade extending horizontally, said blade having the end portions disposed between said guide plates for limited movement vertically to and from said base plate, an electric heating element carried by said metal blade for heating said blade to a desirable plastic wrap heat sealing temperature, at least one rocker arm carried by said base plate for engaging the bottom edge of said metal blade, said rocker arm being movable about a generally horizontal axis, a crank rod carried by said base along the length thereof and having a laterally offset portion below said rocker arm for raising said rocker arm and permitting it to drop, spring means for biasing said blade to a down position, a handle for said crank rod to cause said offset portion to rock said arm for elevating and dropping said blade, said crank and rocker arrangement being unstable in any position except the normal down position of said rocker arm and blade, said housing having a gap above said blade for the length thereof, said blade being so positioned that in the up position of said blade the free edge thereof extends into the gap of said housing, a press bar assembly, means for pivotally securing said press bar assembly at one housing end portion for movement toward and away from said gap, said press bar assembly being so dimensioned and positioned that when it is moved to the down position toward said gap, said assembly will cover said gap above the free edge of said blade, means for locking the free end of said press bar assembly in position so that the entire length of the press bar assembly extends along the housing and covers the gap, soft heat insulating nonstick means carried by said press bar assembly and adapted to provide a backing against which a hot blade edge may press plastic wrap to be heat sealed without sticking to said press bar assembly, said work to be heat sealed being adapted to be locked between said press bar assembly and housing above said gap, whereby when said metal blade is in heat sealing condition it is momentarily pushed upwardly into position to press against the work, after which the blade is dropped away from the gap due to the unstable condition of said blade actuating means.

5. The construction according to claim 4 wherein said nonstick material in said press bar assembly is a plastic of the group consisting of silicone rubber and Teflon.

6. The construction according to claim 2 wherein said heating element is secured to the lower part of the blade and wherein thermostatic switch means are provided to maintain said blade temperature at a desired value.